United States Patent
Nakatugawa et al.

(10) Patent No.: US 7,554,950 B2
(45) Date of Patent: Jun. 30, 2009

(54) HANDOVER METHOD AND MOBILE COMMUNICATION SYSTEM AND MOBILE TERMINAL USING SAME

(75) Inventors: Keiichi Nakatugawa, Kawasaki (JP); Ryuichi Takechi, Kawasaki (JP); Hideaki Takusagawa, Kawasaki (JP); Hideaki Ono, Hagi (JP)

(73) Assignee: Fujitsu Limited, Kawasaki (JP)

( * ) Notice: Subject to any disclaimer, the term of this patent is extended or adjusted under 35 U.S.C. 154(b) by 301 days.

(21) Appl. No.: 11/038,057

(22) Filed: Jan. 21, 2005

(65) Prior Publication Data

US 2006/0056349 A1    Mar. 16, 2006

(30) Foreign Application Priority Data

Sep. 10, 2004  (JP)  ............................. 2004-263999

(51) Int. Cl.
H04B 7/212  (2006.01)
(52) U.S. Cl. ........................... 370/331; 455/442
(58) Field of Classification Search ............ 455/442, 455/444, 552.1, 553.1; 370/331, 334
See application file for complete search history.

(56) References Cited

U.S. PATENT DOCUMENTS

| | | | | |
|---|---|---|---|---|
| 6,418,130 B1 * | 7/2002 | Cheng et al. | ................ | 370/331 |
| 6,982,949 B2 * | 1/2006 | Guo et al. | ................... | 370/210 |
| 2002/0068570 A1 * | 6/2002 | Abrol et al. | ................. | 455/438 |
| 2004/0067754 A1 * | 4/2004 | Gao et al. | ................... | 455/442 |
| 2004/0192307 A1 * | 9/2004 | Watanabe et al. | ........... | 455/436 |
| 2005/0053034 A1 * | 3/2005 | Chiueh | ....................... | 370/331 |
| 2005/0249161 A1 * | 11/2005 | Carlton | ....................... | 370/331 |
| 2006/0159048 A1 * | 7/2006 | Han et al. | ................... | 370/331 |
| 2006/0199588 A1 * | 9/2006 | Gao et al. | ................... | 455/442 |

FOREIGN PATENT DOCUMENTS

JP    2002-364095    12/2002

OTHER PUBLICATIONS

"Seamlesslink," URL: http://software.fujitsu.com/jp/seamlesslink, Fujitsu Japan, Jan. 27, 2003.

* cited by examiner

*Primary Examiner*—Erika A Gary
(74) *Attorney, Agent, or Firm*—Hanify & King, PC

(57) ABSTRACT

A handover method in a mobile communication system utilizing the Mobile IP, which method solves the problem of the loss of communication packets (packet loss) and deterioration of the quality of service occurring when switching communication media, including switching connection from a first network NW1 to which a terminal is currently connected to a second network NW2 at which time transferring once to a third network NW3 (first step), establishing connection with the second network NW2 during the transfer (second step), then breaking the connection with the third network NW2 and transferring to the second network NW2 (third step).

11 Claims, 11 Drawing Sheets

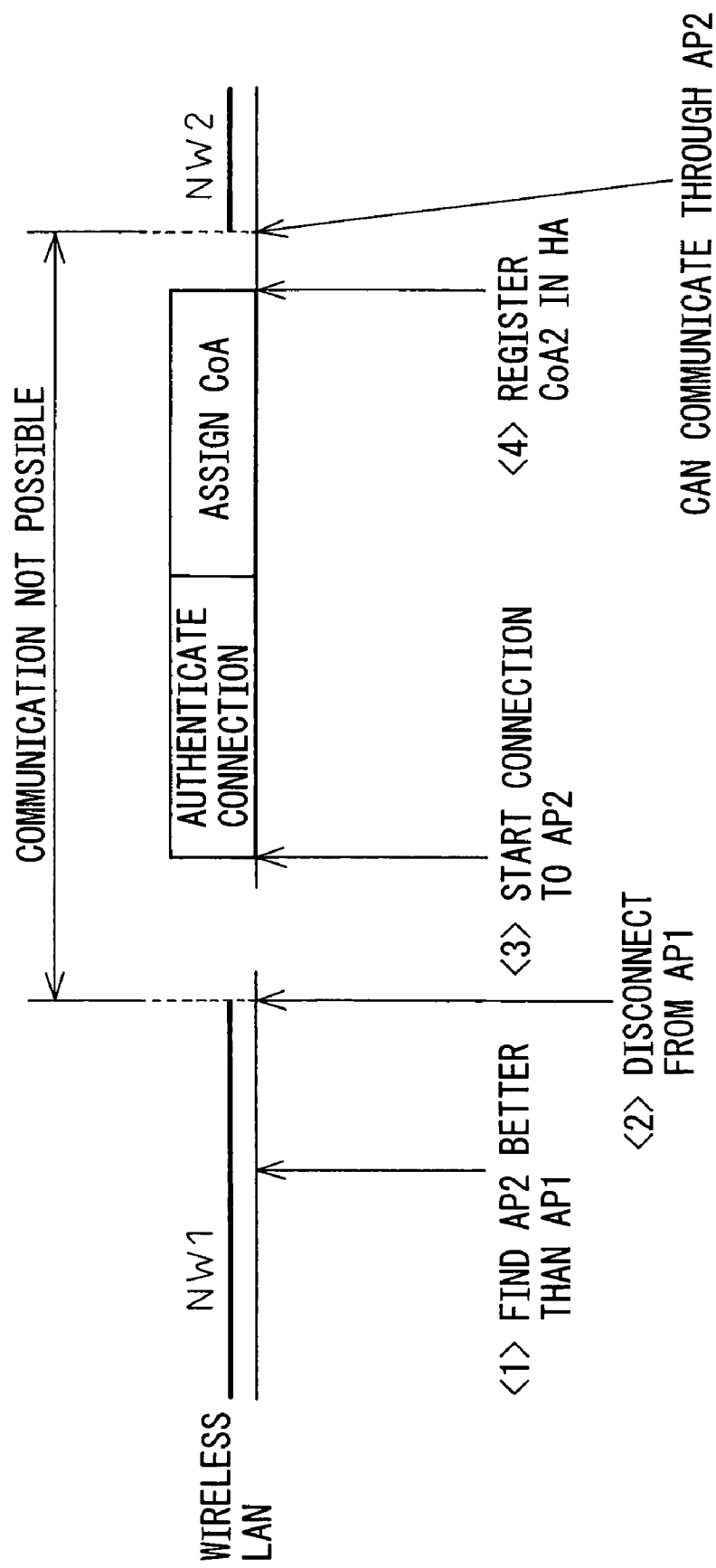

HANDOVER METHOD AND MOBILE COMMUNICATION SYSTEM AND MOBILE TERMINAL USING SAME

BACKGROUND OF THE INVENTION

1. Field of the Invention

The present invention relates to a method of switching communications in a mobile communication system, more particularly relates to a handover method for switching base transceiver stations and access points in accordance with movement of a mobile terminal.

2. Description of the Related Art

In recent years, in addition to the top communication media of W-CDMA and other cellular networks, other communication media such as wireless local area networks (LAN's) and the Personal Handyphone System (PHS) network have become usable at relatively low charges. Therefore, it has become possible to communicate while freely selecting among these communication media in accordance with the signal conditions at the location or the communication conditions required by the user.

"Mobile IP" is the latest specification of TCP/IP considering movement of terminals. It is also best suited for use in communication environments enabling a plurality of types of communication media to be selected from. Notebook personal computers (PC's), personal digital assistants (PDA's), mobile phones, PHS terminals, etc. designed for the Mobile IP are rapidly spreading in use.

The present invention proposes a new technique for the handover essential when a notebook PC, PDA, or other mobile terminal based on Mobile IP technology switches base transceiver stations or access points along with movement in a communications environment including a plurality of such communication media. Note that as known art relating to the present invention, there are Japanese Unexamined Patent Publication (Kokai) No. 2004-200789 and Japanese Unexamined Patent Publication (Kokai) No. 2004-200789 discloses a system particularly able to prevent an increase in network traffic when there are insufficient management resources of a home agent in a Mobile IP network environment, while provides a "seamless link" as a product using the Mobile IP standard.

As will be explained in detail later with reference to FIG. 10 and FIG. 11, the above "Mobile IP" standard basically calls for registering the correspondence between home addresses (HoA) and "care-of" addresses (CoA) in a home agent (HA). Here, a "home address" (HoA) is an address assigned to each mobile terminal and remains unchanged even with movement. Further, a care-of address is an address assigned to each communication media (network card) which a mobile terminal can utilize at a destination and changes along with movement. By registering pairs of fixed home addresses (HoA) and variable care-of addresses (CoA) in the home agent (HA), a terminal communicating with a registered mobile terminal can continue communicating with that mobile terminal automatically regardless of the latter's location, no matter where that mobile terminal moves to, that is, no matter how the care-of address (CoA) changes, so long as connected to the home address (HoA).

However, according to the handover method using the known Mobile IP technology, the following problem arises if switching communication among different communication media (communication networks).

There is the problem that at the time of the above switching of communication, the transmission packets in the middle of transfer are lost, i.e., so-called "packet loss" ends up occurring. This problem naturally causes degradation of the quality of service (QoS) and causes obstacles when real time communication is required such as with IP telephoning.

This problem becomes particularly conspicuous in handover during communication using the recently fast spreading wireless LAN's. For example, the above degradation of the quality of service becomes remarkable under circumstances where the IP address (CoA) is changed for handover at the time when a mobile terminal shifts from connection with the communication network of a current access point (AP) to connection with a communication network of a separate access point (AP) along with movement of a user. This is due to the following reason.

That is, when switching the communications network from a current access point (AP1) to another access point (AP2) (handover), it is necessary to go through the later explained authentication process and care-of address (CoA) assignment process, so a relatively long suspension of service of for example several seconds ends up occurring. In the end, it is only after several seconds have past from the start of switching of the communications network that registration at the new CoA by the Mobile IP finishes. During the suspension of service, the above packet loss and therefore degradation of the quality of communication end up occurring.

SUMMARY OF THE INVENTION

An object of the present invention is to provide a handover method not causing degradation of the quality of service due to packet loss when switching communications networks.

Another object is to provide a mobile communication system and mobile terminal using this handover method.

To attain the above objects, the handover method of the present invention comprises switching connection from a first network NW1 to which a terminal (4) is currently connected to a second network NW2 at which time transferring once to a third network NW3 (S11 of FIG. 1), establishing connection with the second network NW2 during the transfer (S12 of FIG. 1), then breaking the connection with the third network NW2 and transferring to the second network NW2 (S13 of FIG. 1).

BRIEF DESCRIPTION OF THE DRAWINGS

These and other objects and features of the present invention will become clearer from the following description of the preferred embodiments given with reference to the attached drawings, wherein:

FIG. 11 is a time chart of a handover operation in the system of FIG. 10.

DESCRIPTION OF THE PREFERRED EMBODIMENTS

Preferred embodiments of the present invention will be described in detail below while referring to the attached figures.

Figure 1:
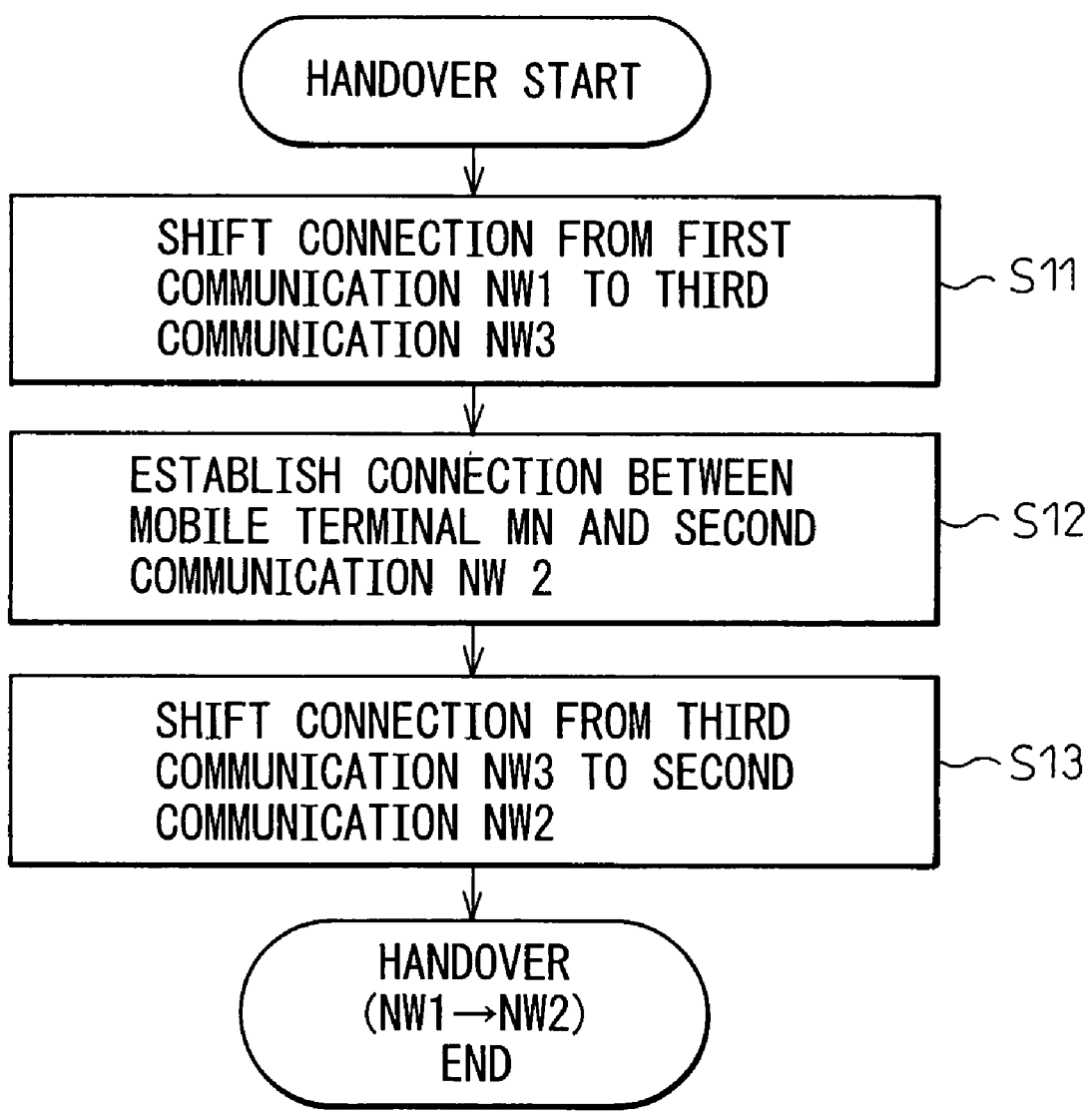
FIG. 1 is a flow chart of a handover method based on the present invention.

FIG. 1 is a flow chart of a handover method according to the present invention.

First, the handover method upon which the present invention is predicated is a method for handover of a mobile terminal from a first communication network (NW1) to a second communication network (NW2) in a mobile communication system having at least three types of communication networks and a mobile terminal (NM) able to connect to any of these three types of communication networks (NW).

In the process of such handover, the steps characterizing the present invention are the steps S11, S12, and S13 in the flow chart of this drawing.

First, at the first step S11, the handover starts, whereupon the connection between the mobile terminal (MN) and the first communication network (NW1) is temporarily shifted to connection between the mobile terminal (MN) and the third communication network (NW3).

Next, at the second step S12, during the above temporary shift, connection is established between the mobile terminal (MN) and the second communication network (NW2).

Further, at the third step S13, after connection with the second communication network (NW2) is established, connection between the mobile terminal (MN) and second communication network (NW2) is shifted to. Here, the communication network NW1→NW2 handover is completed.

Here, the meaning of the "shift" appearing at the first step S11 and the third step S13 will be explained in a bit more detail. This "shift" comes in for example two modes. In the first mode is, during the above handover process, the shift of communication network NW1→NW3 and the shift of communication network NW3→NW2 are achieved by "transfer".

In the other mode is, during the above handover process, the shift of communication network NW1→NW3 and the shift of communication network NW3→NW2 are achieved by "switching" and "switch back".

More specifically, the "transfer" in the first mode means realization of the above shift without any "processing for connection of a communication link" and "processing for disconnection of a communication link" between the two communication networks. Further, the above "switching/switch back" in the second mode means realization of the above shift with "processing for connection of a communication link" and "processing for disconnection of a communication link" between the two communication networks.

Giving a specific example, the "transfer" of the above first mode can be realized when a mobile terminal (MN) is in an "always on" state with the third communication network (NW3), while the "switching" and "switch back" of the second mode can be realized when the mobile terminal (MN) and third communication network (NW3) are not in the "always on" state. Which case applies depends on whether the user of the mobile terminal has subscribed to an "always on" service provided by the communication network (NW3) (first mode) or not (second mode).

Summarizing the above, in the first mode ("always on" enabled), at the first step S11 of FIG. 1, the mobile terminal (MN) transfers from the first communication network (NW1) to the third communication network (NW3) without any processing for connection of a communication link, while at the third step S13, the mobile terminal transfers from the third communication network (NW3) to the second communication network (NW2) without any processing for disconnection of a communication link so as to thereby execute the handover.

In the second mode ("always on" disabled), at the first step S11, the mobile terminal (MN) switches from the first communication network (NW1) to the third communication network (NW3) with processing for connection of a communication link, while at the third step S13, the mobile terminal (MN) switches back from the third communication network (NW3) to the second communication network (NW2) with processing for disconnection of a communication link.

Summarizing the effects of the invention, according to the handover method of the present invention shown in FIG. 1, when starting handover from the first communication network (NW1) to the second communication network (NW2), first the communication link of the mobile terminal (MN) is shifted once to the third communication network (NW3). During this shift, a communication link is established between the mobile terminal (MN) and the second communication network (NW2) to be handed over to. Due to this, suspension of service can be made to appear as if it never occurred. As a result, no packet loss occurs during the handover and the quality of service is no longer degraded.

The handover method shown in FIG. 1, as explained above, includes the first mode ("always on" enabled) and the second mode ("always on" disabled). The effects of the invention will be explained in further detail for the two modes.

First, according to the handover method under the first mode, one of the plurality of communication networks available for use is selected. Consider the case when selecting the first communication network and desiring to select and switch to the second communication network. Specifically, if the first communication network is connected with through an access point (AP1) of a wireless LAN and the second communication network is connected with through an access point (AP2) of another segment of a wireless LAN, when switching access points of the wireless LAN, the processing for authentication of the mobile terminal and the processing for assignment of the IP address will take time and packet loss will end up occurring during the processing.

Therefore, the third communication network is temporarily utilized. This third communication network for example is a cellular network. In selecting and switching from the wireless LAN to the cellular network, the switching is performed in the state with these two networks and the mobile terminal connected, so the above packet loss cannot occur. By transferring once to the third communication network at the time of selecting and switching networks, it is possible to prevent degradation of the quality of service.

Next, according to the handover method under the second mode, assume the case where the third communication network is not always on. When switching from the first communication network to the second communication network, the network is selected and switched to and the third communication network is temporarily connected to. After this, the connection with the first communication network is broken. Next, the mobile terminal is connected to the second communication network for selection and switching, then the connection between the third communication network and the mobile terminal is broken.

In the second mode, due to the processing for connection/disconnection, the user's costs rise by that amount, but since another communication network is connected to only at the time of switching, the user's costs are not so increased and the above degradation of the quality of service can be prevented.

To clarify the effects rendered by the present invention, first, the handover method according to the related art will be explained.

Figure 10:
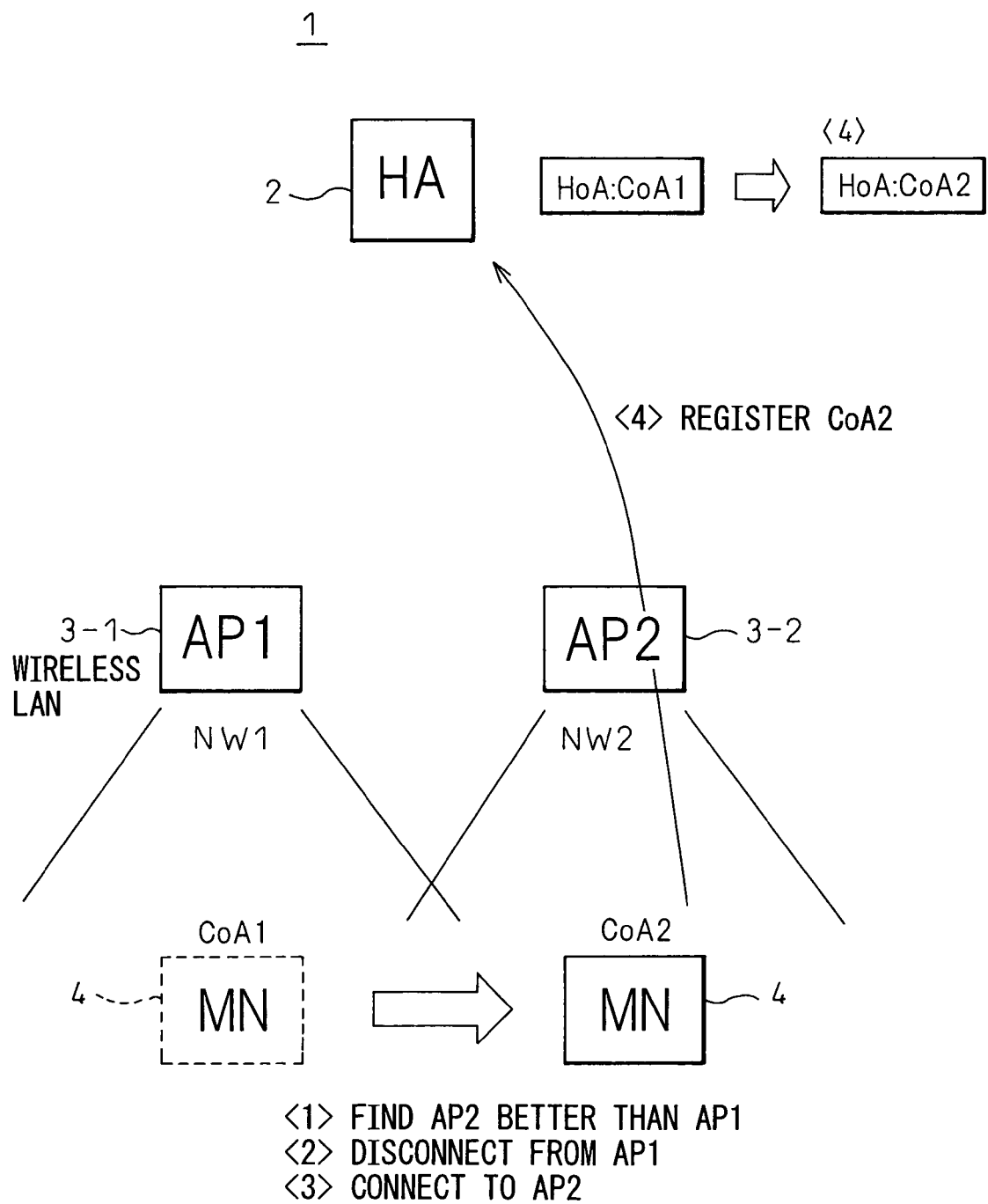
FIG. 10 is a view of an example of a mobile communication system using a conventional handover method.

FIG. 10 is a view of an example of a mobile communication system using a conventional handover method, while FIG. 11 is a time chart of the handover operation in the system of FIG. 10.

First, referring to FIG. 10, the mobile communication system 1 shown as one example in the figure is a mobile communication system for switching communication using the above Mobile IP technology. This mobile communication system 1 services a large number of mobile terminals of a large number of different types, but in the figure, a single mobile terminal 4 serving as a so-called "mobile node" (MN) is shown. Further, the mobile terminal 4 before movement (left) and the mobile terminal 4 after movement (right) are shown together.

According to the example of this figure, before and after movement, the mobile terminal 4 is connected with the above-mentioned wireless LAN for communication with another terminal (not shown). Before the movement, it connects to a first access point (AP1) 3-1 forming a first communication network NW1, while after movement, it connects to the second access point (AP2) 3-2 forming the second communication network NW2. To execute the handover smoothly from before to after the move, the above-mentioned home agent (HA) 2 is provided in the system 1. This home agent 2 is a so-called Mobile IP server. More particularly, the home agent 2 acts to encapsulate and forward an IP datagram sent from a not shown other terminal in an IP tunnel.

The crux of the present invention is the handover, so the handover operation performed in the mobile communication system 1 will be explained along the time chart of FIG. 11. Note that <1>, <2>, <3> . . . in FIG. 11 correspond to <1>, <2>, <3> . . . in FIG. 10.

The invention will be explained next referring to FIG. 10 and FIG. 11. The mobile terminal 4 which had been connected to the first communication network NW1 formed by the first access point (AP1) 3-1 with the care-of address CoA1 detects that the signal conditions are deteriorating along with movement of the user. At this time, the mobile terminal 4

<1> discovers a second access point (AP2) 3-2 with better signal conditions than the current access point (AP1) 3-1. Then, the mobile terminal 4

<2> breaks the communication link with the access point (AP1) 3-1 so as to release the connection with the first communication network NW1. After this, the mobile terminal 4

<3> starts the operation for connection with the second access point (AP2) 3-2 so as to connect with the second communication network NW2. For connection with the second access point (AP2) 3-2, the care-of address CoA1 registered before movement has to be re-registered to the care-of address CoA2 after movement at the home agent (HA) 2. Therefore, it is necessary to perform processing for authentication of connection, then processing for new assignment of a CoA. This authentication of connection checks if the user is one for which receipt of the communication service is allowed. This check is performed by an authentication server (not shown) connected to a router (not shown) in the system.

<4> After authentication, the CoA1 is re-registered to the new care-of address CoA2. That is, the home agent (HA) 2 registers an updated CoA2 for the mobile terminal 4 paired with a fixed home address (HoA).

Here, for the first time, a communication link is established with the second communication network NW2 through the second access point (AP2), whereupon the series of steps of the handover operation end. The problem which the present invention attempts to solve in this handover is the degradation of the quality of service due to the occurrence of packet loss. This packet loss occurs due to the above suspension of service occurring during switching from the first communication network NW1 to the second communication network NW2. That is, it occurs in the period of "communication not possible" shown in the figure. This period extends to as much as several seconds in some cases and becomes a major obstacle in communication for which a real time property is sought. An example of the mobile communication system of the present invention able to eliminate this obstacle will be explained in detail below.

Figure 2:
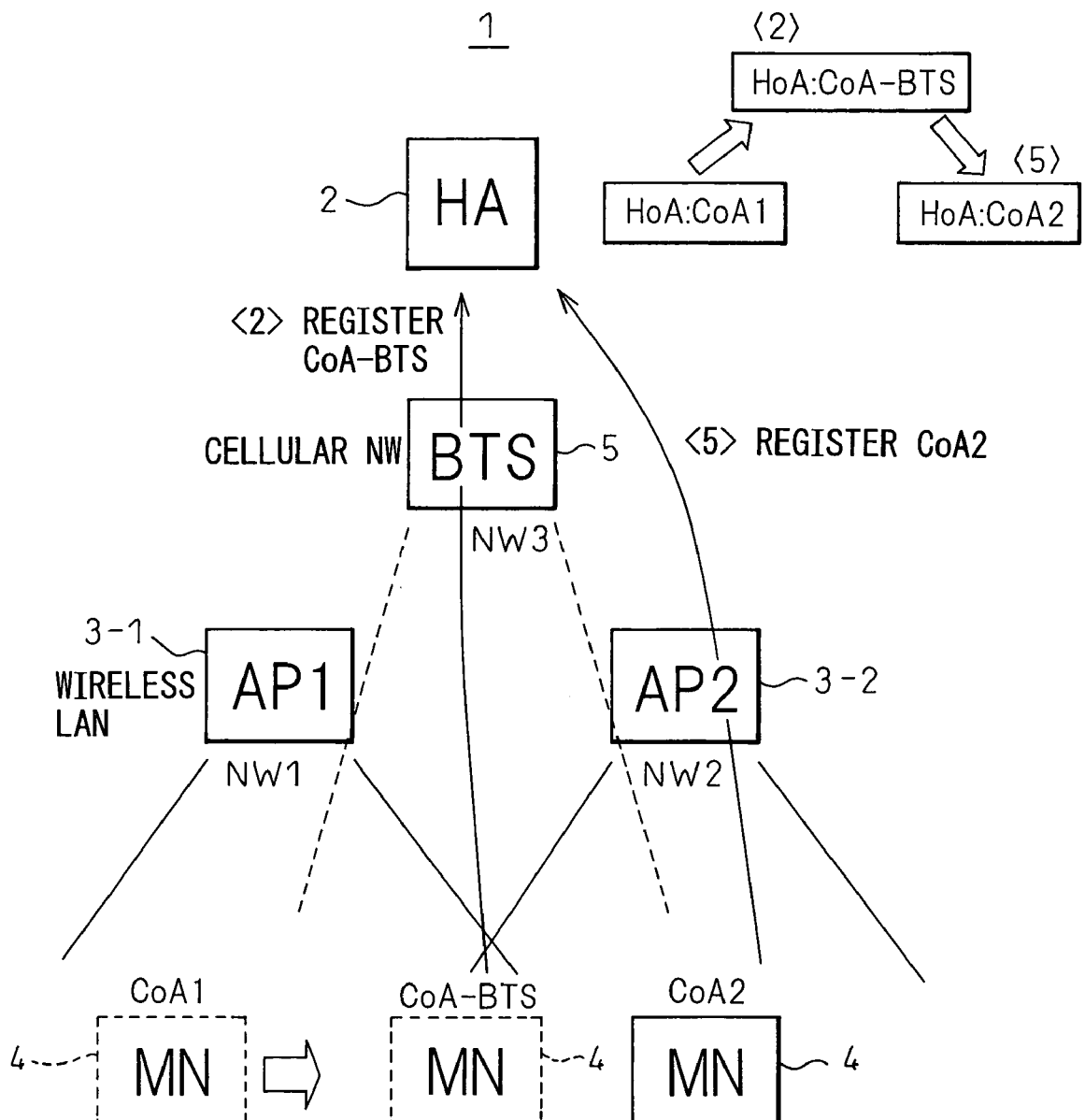
FIG. 2 is a view of a first example of a mobile communication system using the handover method of the present invention.
Figure 3:
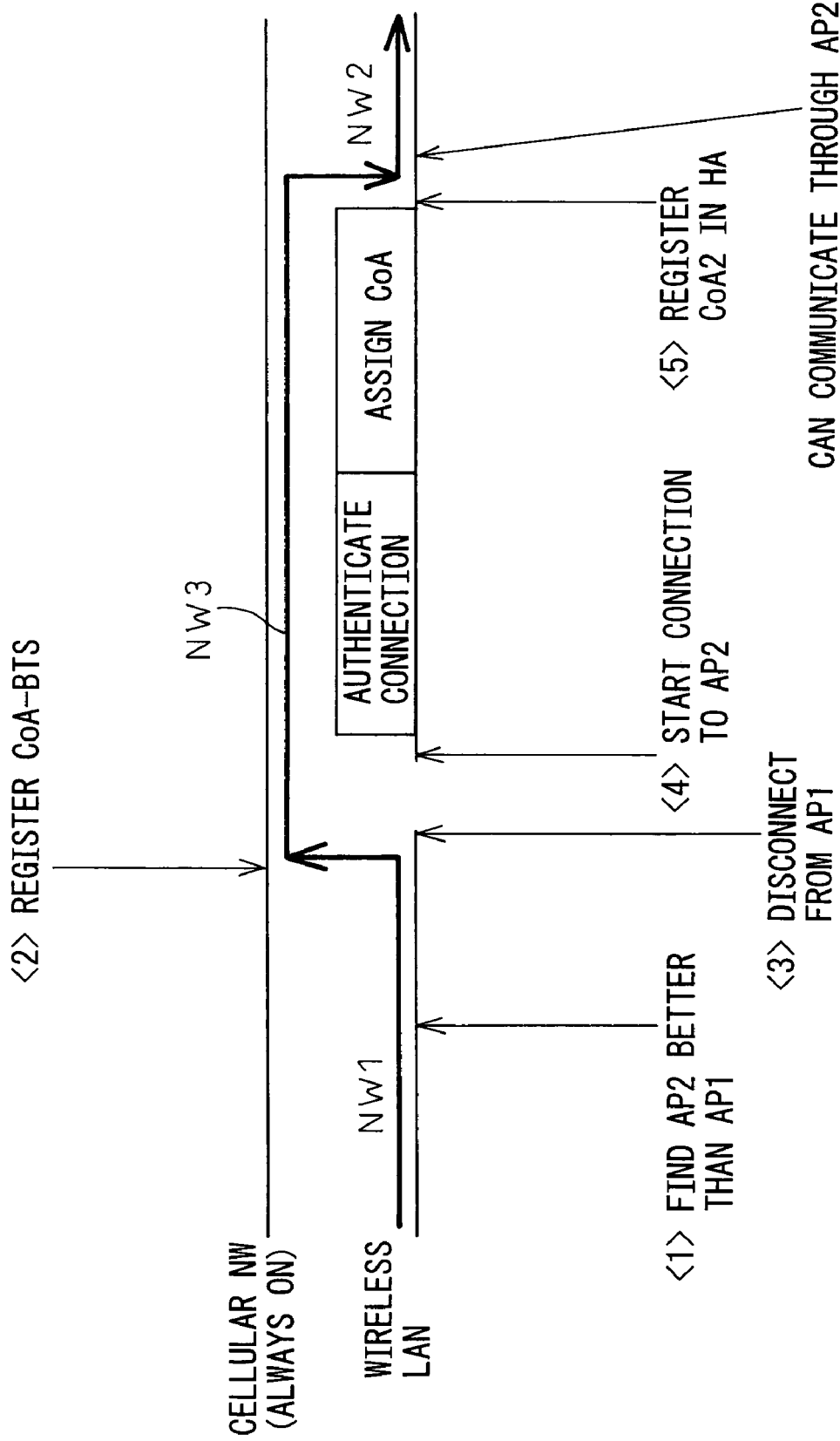
FIG. 3 is a time chart of a handover operation in the system of FIG. 2.

FIG. 2 is a view of a first example of a mobile communication system using the handover method of the present invention, that is, a mobile communication system according to the first mode. FIG. 3 is a time chart of a handover operation in the system 1 of FIG. 2. Note that FIG. 2 and FIG. 3 should be viewed in the same way as FIG. 10 and FIG. 11. Further, throughout the drawings, similar components are assigned the same reference numerals or symbols.

Explaining the invention with reference to FIG. 2 and FIG. 3, the mobile terminal 4 which had been connected to the first communication network NW1 formed by the first access point (AP1) 3-1 with the care-of address CoA1 detects that the signal conditions are deteriorating along with movement of the user. At this time, the mobile terminal 4

<1> discovers a second access point (AP2) 3-2 with better signal conditions than the current access point (AP1) 3-1. Then, the mobile terminal 4 does not perform the process of "disconnection of AP1→connection to AP2" as in the past. That is, the mobile terminal 4 according to the first mode of the invention <2> transfers to the base transceiver station (BTS) 5 forming the third communication network NW3. The third communication network NW3 is a cellular network according to the example of this drawing. In the first mode, as explained above, the mobile terminal 4 is connected "always on" to the cellular network (NW3) and the process up to the registration of the care-of address CoA-BTS at the home agent (HA) 2 can be performed immediately. When the CoA-BTS finishes being registered, that is, when transferring once to the third communication network NW3, the mobile terminal 4

<3> breaks the connection held up to then with the access point (AP1). After finishing breaking the connection, the mobile terminal 4

<4> starts the operation for connection with the second access point AP2. That is, it enters the process for establishing a communication link with AP2. This process is completely the same as the processing of processes <3>→<4> of FIG. 11, that is, "authentication of connection"→"assignment of CoA".

<5> After the process <4>, the new care-of address CoA2 finishes being registered at the home agent (HA) 2. Here, the mobile terminal 4 can finish connecting with the second communication network NW2 originally for handover and continue communicating with the other terminal without packet loss through the access point (AP2) 3-2.

Figure 4:
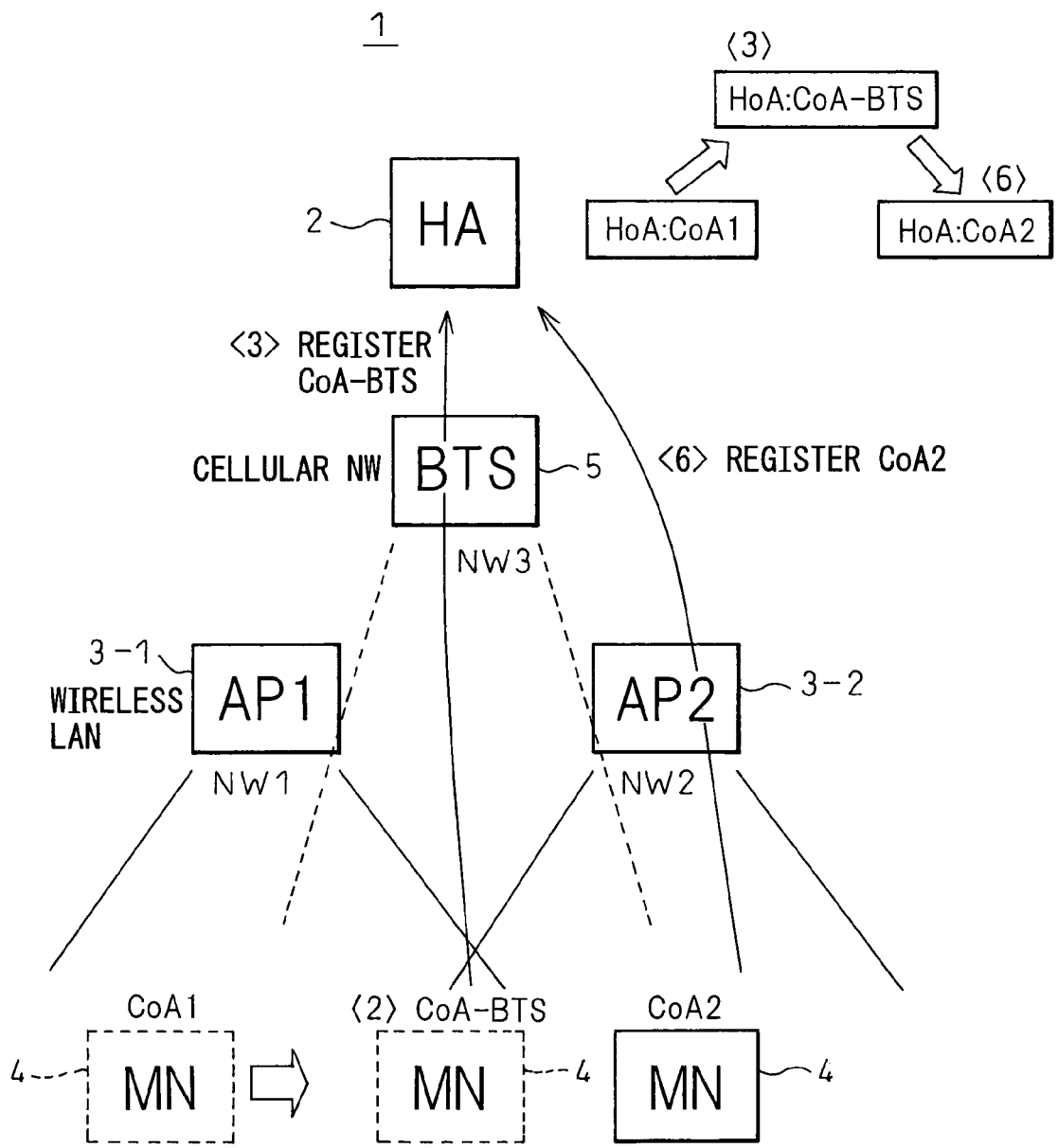
FIG. 4 is a view of a second example of a mobile communication system using the handover method of the present invention.

FIG. 4 is a view of a second example of a mobile communication system using the handover method of the present invention, that is, a mobile communication system according to the second mode. FIG. 6 is a time chart of a handover operation in the system 1 of FIG. 4. Note that FIG. 4 and FIG. 5 should be viewed in the same way as FIG. 2 and FIG. 4.

Figure 5:
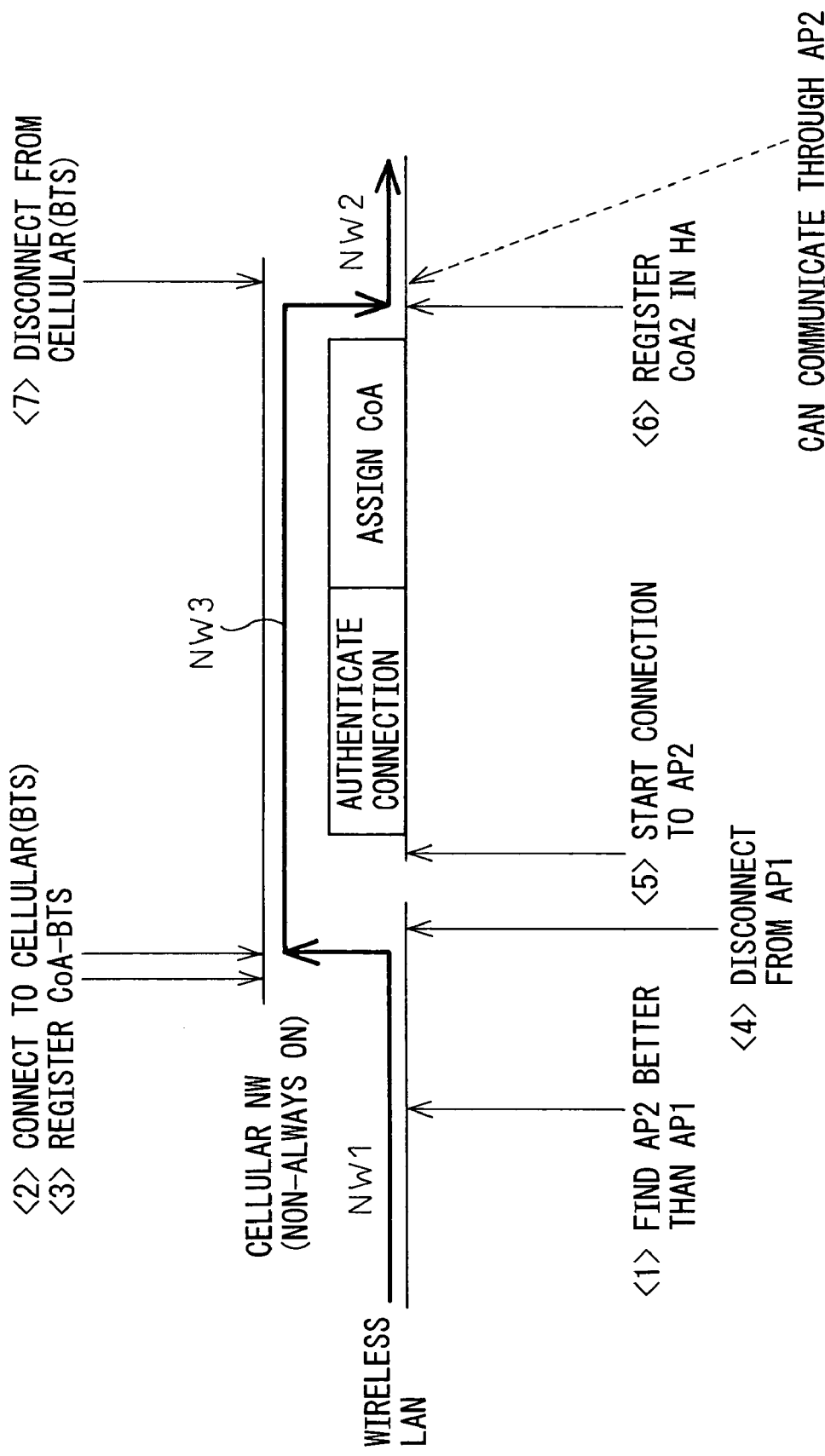
FIG. 5 is a time chart of a handover operation in the system of FIG. 4.
Figure 6:
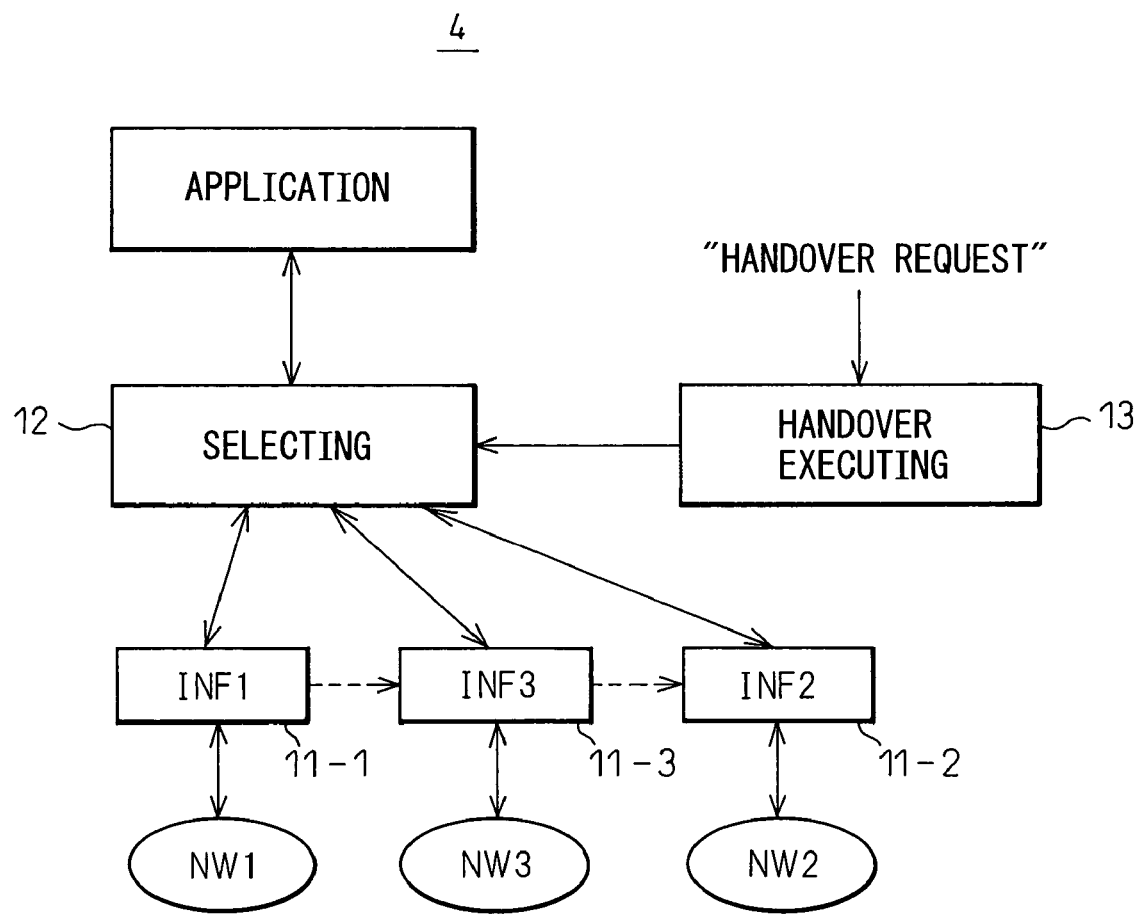
FIG. 6 is a view of the basic configuration of a mobile terminal according to the present invention.

Explaining the invention with reference to FIG. 4 and FIG. 5, the mobile terminal 4 which had been connected to the first communication network NW1 formed by the first access point (AP1) 3-1 with the care-of address CoA1 detects that the signal conditions are deteriorating along with movement of the user. At this time, the mobile terminal 4

<1> discovers a second access point (AP2) 3-2 with better signal conditions than the current access point (AP1) 3-1. Then, the mobile terminal 4 does not perform the process of "disconnection of AP1→connection to AP2" as in the past. That is, the mobile terminal 4 according to the second mode of the invention <2> switches to the base transceiver station (BTS) 5 forming the third communication network NW3. The third communication network NW3 is a cellular network according to the example of this drawing. In the second mode, as explained above, the mobile terminal 4 is not connected "always on" to the cellular network (NW3), so switching by the process <2> is necessary. Note that in FIG. 3 assuming the always-on state, the process corresponding to the process <2> is unnecessary. Finishing this switching, the mobile terminal 4 then:

<3> registers the care-of address CoA-BTS at the home agent (HA) 2. When the CoA-BTS finishes being registered, that is, when switching once to the third communication network NW3, the mobile terminal 4

<4> breaks the connection held up to then with the access point (AP1). After finishing breaking the connection, the mobile terminal 4

<5> starts the operation for connection with the second access point AP2 as in the past. That is, it enters the process for establishing a communication link with AP2. This process is completely the same as the processing of processes <4>→<5> of FIG. 3, that is, "authentication of connection"→"assignment of CoA".

<6> After the process <5>, the new care-of address CoA2 finishes being registered at the home agent (HA) 2. Here, the mobile terminal 4 can finish connecting with the second communication network NW2 originally for handover and continue communicating with the other terminal without packet loss through the access point (AP2) 3-2.

Summarizing the mobile communication system shown in FIG. 2 and FIG. 4 above, the mobile communication system 1 is a mobile communication system constructed including at least three types of communication networks and at least a mobile terminal able to connect to any of these three types of communication networks. Here, the mobile terminal connects once to a third communication network and holds that communication state when handing over service from the first communication network to the second communication network so as to achieve seamless handover.

In this case, the mobile terminal of the first mode transfers among the first, third, and second communication networks without any processing for connection/disconnection of a communication link. Further, the mobile terminal of the second mode switches and switches back among the first, third, and second communication networks with processing for connection/disconnection of a communication link.

Note that in FIG. 2 and FIG. 4, as the first, second, and third communication networks (NW1, NW2, and NW3), the example is shown where NW1=wireless LAN-AP1
NW2=wireless LAN-AP2
NW3=cellular network but the invention is not limited to this. The communication media may be of any types. For example, the example where NW1=wireless LAN-AP1
NW2=wireless LAN-AP2
NW3=wireless LAN-AP3 (third access point)

is also possible or

NW1=PHS network
NW2=cellular network
NW3=wireless LAN is also possible. However, these communication media only naturally have to be communication media with which mobile terminals can communicate wirelessly at their locations when there are signals available.

The above handover method of the present invention can be realized by a mobile terminal (mobile node) according to the present invention. Its basic configuration and a specific example will be explained below.

FIG. 6 is a view of the basic configuration of a mobile terminal according to the present invention. In the figure, the mobile terminal 4 is comprised of first, second, and third interface means (INF1, INF2, and INF3) 11-1, 11-2, and 11-3, a selecting means 12, and a handover executing means 13.

More specifically, the mobile terminal is provided with first, second, and third interface means (11-1, 11-2, 11-3) for connection with the first, second, and third communication networks (NW1, NW2, and NW3), a selecting means 12 for alternately selecting one of the first, second, and third interface means and connecting with the corresponding communication network, and a handover executing means 13 for executing the handover from the first communication network NW1 to the second communication network NW2.

Here, the handover executing means 13 receives a "handover request" from the first communication network NW1 to the second communication network NW2 and successively selects the second communication network NW2 instead of the first communication network NW1 through the handover. At this time, it controls the selecting means 12 so as to temporarily select the third communication network NW3, that is, the backup network, instead of the second communication network NW2 during the handover period.

Figure 7:
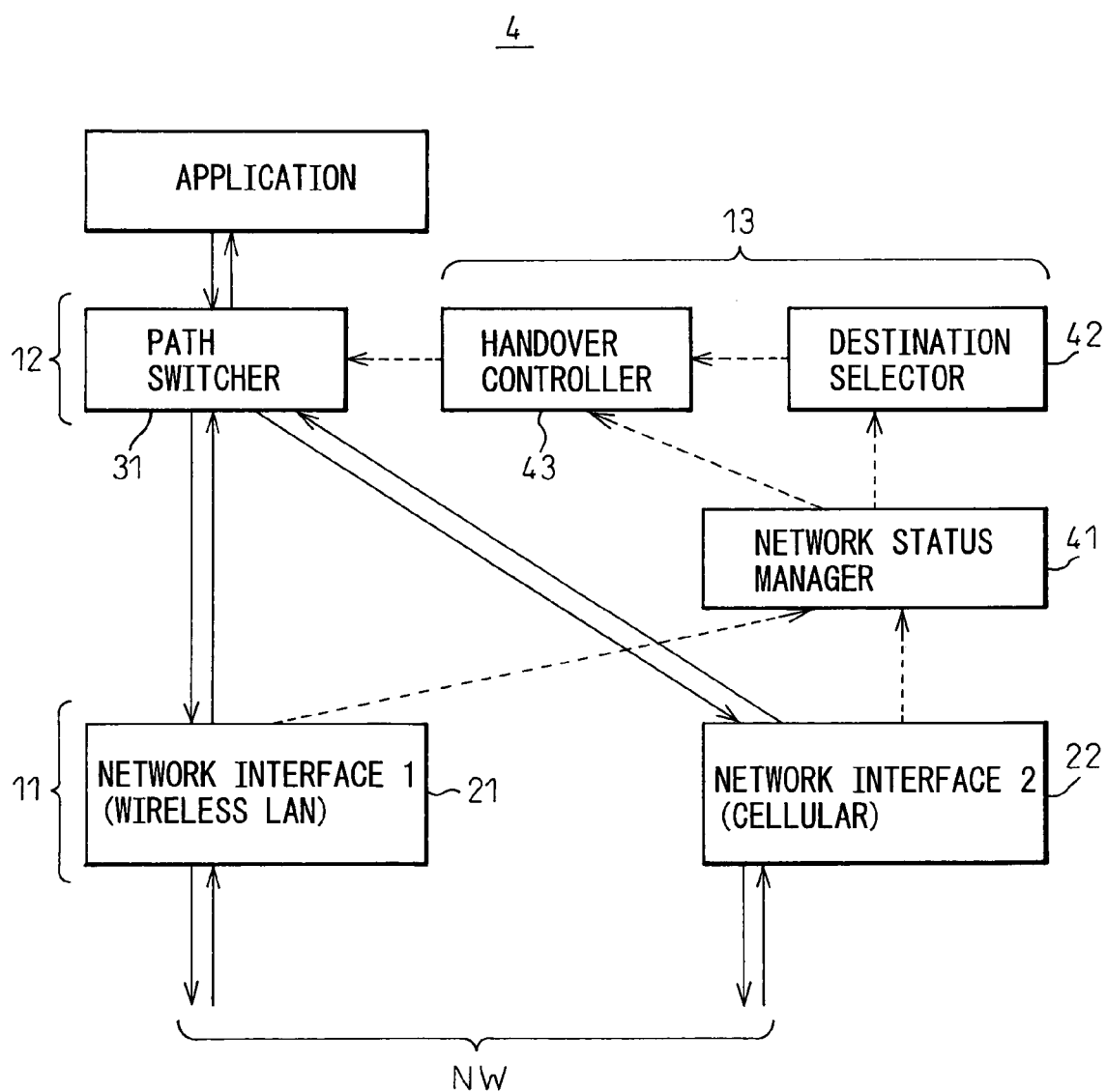
FIG. 7 is a view of a specific example of a mobile terminal according to the present invention.

FIG. 7 is a view of a specific example of a mobile terminal according to the present invention. The configuration of this figure corresponds to the mobile communication system 1 shown in FIG. 2 and FIG. 4 explained above. In FIG. 7, as the interface means (11) of FIG. 6, two network interfaces 21 and 22 are shown.

That is, when the first and the second communication networks (NW1 and NW2) are formed by the first and second access points (AP1 and AP2) belonging to the same communication media (for example, wireless LAN's), the first and second interface means (11) are comprised by a single common interface means (network interface 21 of FIG. 7).

Referring to FIG. 7 and FIG. 6, the handover executing means 13 has a handover controller for making the selecting means 12 select the first, third, and second communication networks (NW1, NW3, and NW2) in this order. This handover controller 43 is an important component in the present invention.

The handover executing means 13 has a network status manager 41 for judging the signal conditions of the communication networks (NW1, NW2, and NW3) and a destination selector 42 for searching for and selecting the best communication network for the handover when judging the signal conditions are poor. The handover controller 43 controls the handover in accordance this determination.

On the other hand, the selecting means 12 has a path switcher 31 controlled by the handover controller 43 and switching the path of the data to be transferred among the plurality of interface means (11-1 to 11-3, 21, 22). Note that in FIG. 7, the solid line arrows show the flow of communication data (packets), while the broken line arrows show the flow of control information.

Figure 8:
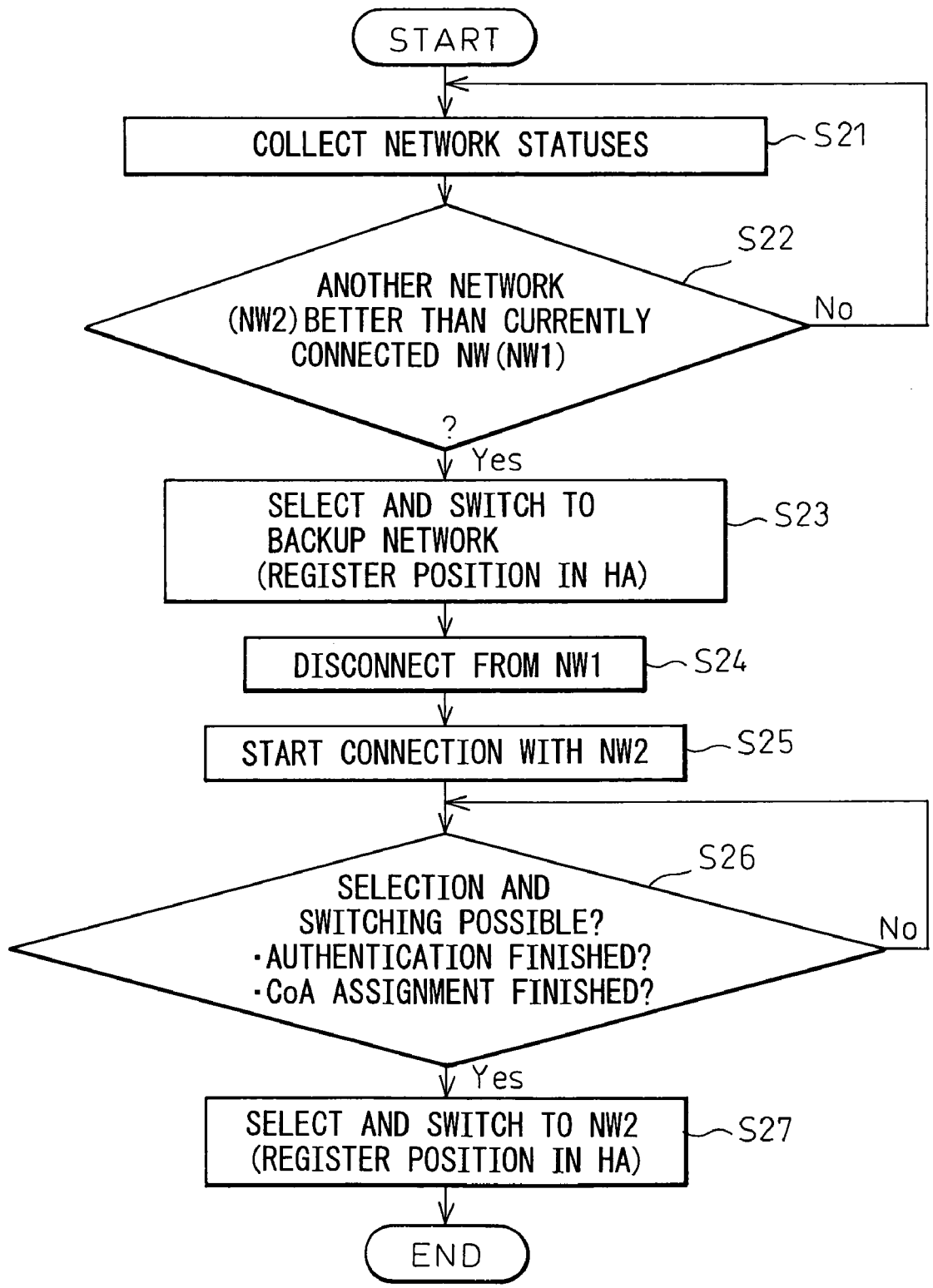
FIG. 8 is a flow chart of an example of the operation of a mobile terminal 4 according to a first mode of the invention.
Figure 9:
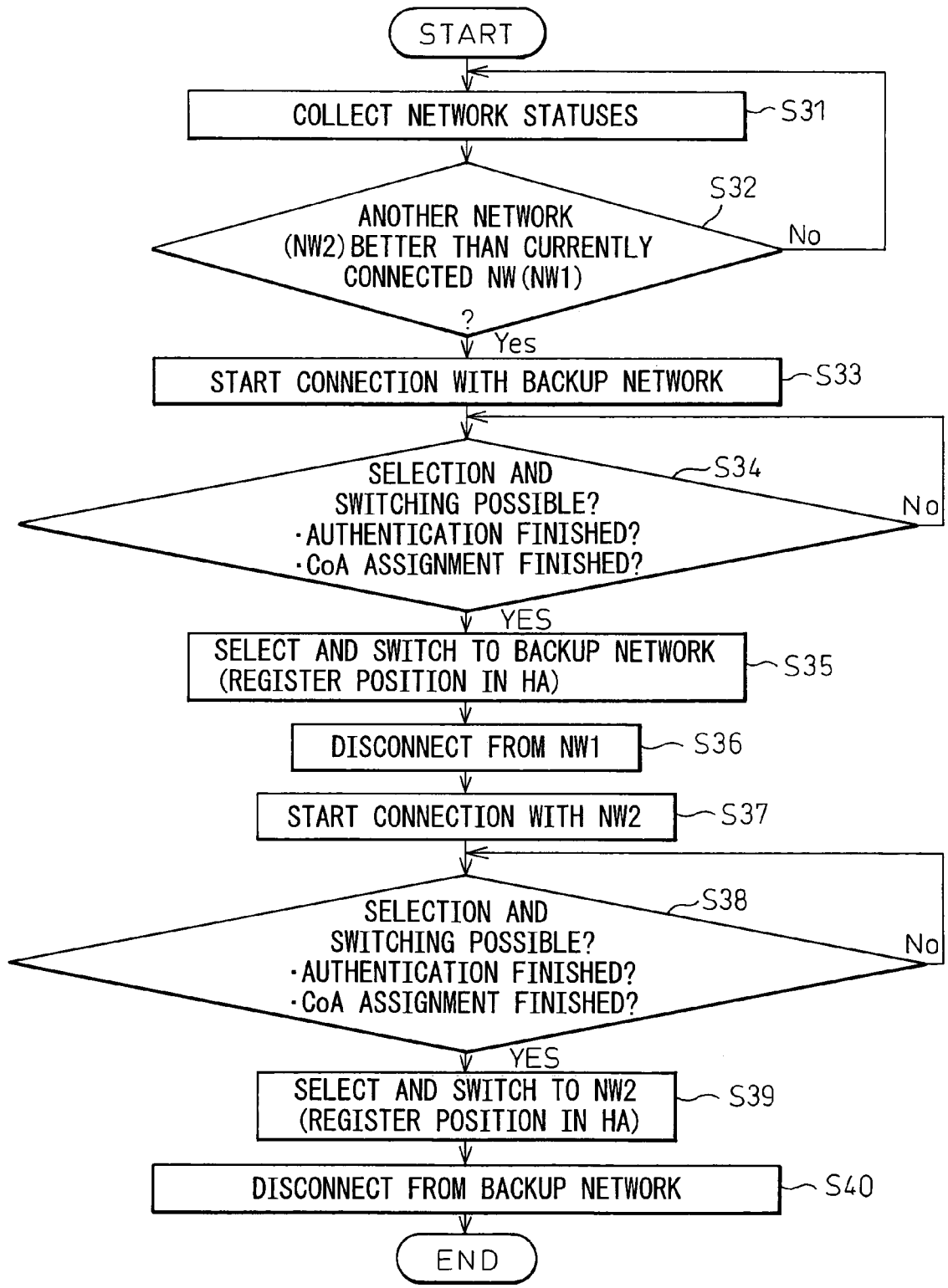
FIG. 9 is a flow of an example of the operation of a mobile terminal 4 according to a second mode of the invention.

Supplementarily explaining the configuration of FIG. 7 in accordance with a practical embodiment, the mobile terminal 4 according to the present embodiment is a device having a network interface 1 (wireless LAN card) 21 and network interface 2 (cellular network card) 22 and is comprised of a network status manager 41, destination selector (MIP: Mobile IP) 42, handover controller 43, path switcher 31, and applications. The network status manager 41 judges if the networks (NW1, NW2, NW3 . . . ) can be utilized by referring to their signal intensities. The destination selector (MIP) 42 judges the best designation network while referring to the networks which can be utilized and if finding a network better than the currently utilized network, executes the routine shown in FIG. 3 and FIG. 5 for changing the destination network in cooperation with the handover controller 43. At this time, the path switcher 31 controls the packets to be sent to one of the networks. The detailed flow of the operation of the mobile terminal 4 is as follows:

FIG. 8 is a flow chart of an example of the operation of a mobile terminal 4 according to the first mode (see FIG. 2 and FIG. 3), while FIG. 9 is a flow chart of an example of the operation of a mobile terminal 4 according to the second mode (see FIG. 4 and FIG. 5).

First, referring to FIG. 8, the routine comprises collecting the network status by the network status manager 41 (S21), then scanning and determining if there is a better communication network than the communication network currently connected with (assume to be NW1).

When the best communication network for switching is found (Yes), the connection selector 42 and the handover controller 43 first switch to the backup network (NW3) (register position at home agent HA) (S23).

After this, the communication network NW1 is disconnected (S24) and the switching to the optimal communication network NW 2 is started (S25). That is, processing is performed for authentication and processing is performed for assignment of CoA, basic standards for the network NW2. After these processings are completed (Yes at S26), the backup network (NW3) which had been temporarily connected to is switched to the original communication network NW2 (S27).

Next, see FIG. 9. Basically, this is the same as FIG. 8. In FIG. 8, processing for connection and processing for disconnection with the backup network (NW3) are added to realize the flow.

That is, the backup network (NW3) is not always on, so after the connection procedure for utilizing the backup network (NW3) (S33, S34, S35), when finishing using the backup network (NW3) for avoiding suspension of service by steps S36, S37, S38, and S39, processing is performed for disconnection (S40).

Note that when the backup network (NW3) is for example a cellular network employing usage-based charges, by connecting with the NW3 only when necessary for handover, it is possible to keep the cost burden on the user to a minimum and avoid a drop in the quality of service occurring at the time of switching the communication networks.

Summarizing the effects of the invention, the invention can be advantageously used for mobile phones or vehicle-mounted equipment of automobiles or trains in communication environments in which ubiquitous networks have spread and in which various networks can be freely switched between for use.

While the invention has been described with reference to specific embodiments chosen for purpose of illustration, it should be apparent that numerous modifications could be made thereto by those skilled in the art without departing from the basic concept and scope of the invention.

What is claimed is:

1. A method for handover of a mobile terminal from a first communication network to a second communication network in a mobile communication system having at least three types of communication networks and a mobile terminal able to connect to any of these three types of communication networks, comprising:
    staffing a temporary shift of connection between the mobile terminal and the first communication network to connection between the mobile terminal and a third communication network when detecting the second communication network;
    during the above temporary shift, establishing connection between the mobile terminal and the second communication network through an uninterrupted seamless handover; and
    after establishing connection with the second communication network, shifting from connection between the mobile terminal and the third communication network to connection between the mobile terminal and the second communication network.

2. A method for handover in a mobile communication system as set forth in claim 1, further comprising,
    in the step of temporary shifting, having said mobile terminal transfer from the first communication network to the third communication network without any processing for connection of a communication link and,
    in the step of shifting to the second communication network, having said mobile terminal transfer from the third communication network to the second communication network without any processing for disconnection of the communication link.

3. A method for handover in a mobile communication system as set forth in claim 1, further comprising,
    in the step of temporary shifting, having said mobile terminal transfer from the first communication network to the third communication network with processing for connection of a communication link and,
    in the step of shifting to the second communication network, having said mobile terminal transfer from the third communication network to the second communication network with processing for disconnection of the communication link.

4. A mobile communication system comprising:
    a first radio communication apparatus which works as an access point for a first communication system;
    a second radio communication apparatus which works as an access point for a second communication system;
    a third radio communication apparatus which works as an access point for a third communication system;
    a mobile terminal;
    wherein the mobile terminal comprises a handover processing unit configured to temporarily shift a first connection in which the first radio communication apparatus is used as an access point to a second connection in which the third radio communication apparatus is used as an access point when the mobile terminal detects the second radio communication apparatus as an access point, establish a third connection in which the second radio communication apparatus is used as an access point while the second connection is maintained and shift the second connection to the third connection.

5. A mobile communication system as set forth in claim 4, wherein said mobile terminal transfers among said first, third, and second communication networks without any processing for disconnection/connection of a communication link.

6. A mobile communication system as set forth in claim 4, wherein said mobile terminal switches and switches back among said first, third, and second communication networks with any processing for disconnection/connection of a communication link.

7. A mobile terminal used in a communication network including a first radio communication apparatus which works as an access point for a first communication network, a second radio communication apparatus which works as an access point for a second communication network; and a third radio communication apparatus which works as an access point for a third communication network; the mobile terminal comprising:

a handover processing unit configured to temporarily shift a first connection in which the first radio communication apparatus is used as an access point to a second connection in which the third radio communication apparatus is used as an access point when the mobile terminal detects the second radio communication apparatus as an access point, establish a third connection in which the second radio communication apparatus is used as an access point while the second connection is maintained and shift the second connection to the third connection.

8. A mobile terminal as set forth in claim 7, wherein when the first and the second communication networks are formed by first and second access points belonging to the same communication media, the first and second interface function units are comprised by a single common interface function unit.

9. A mobile terminal as set forth in claim 7, wherein the handover processing unit has a handover controller for selecting the first, third, and second communication networks in this order.

10. A mobile terminal as set forth in claim 9, wherein the handover processing unit has a network status manager for judging the signal conditions of the communication networks and a destination selector for searching for and selecting the best communication network for the handover when judging the signal conditions are poor, and the handover controller controlling the handover in accordance this determination.

11. A mobile terminal as set forth in claim 9, wherein the handover processing unit has a path switcher controlled by the handover controller and switching the path of the data to be transferred among a plurality of interface units.

* * * * *